US 12,046,255 B2

(12) United States Patent
Tsai et al.

(10) Patent No.: US 12,046,255 B2
(45) Date of Patent: Jul. 23, 2024

(54) SOUND SOURCE TRACKING SYSTEM AND METHOD THEREOF

(71) Applicant: AVER INFORMATION INC., New Taipei (TW)

(72) Inventors: Fu-En Tsai, New Taipei (TW); Feng Wen Hung, New Taipei (TW); Chao-I Li, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 154 days.

(21) Appl. No.: 17/572,100

(22) Filed: Jan. 10, 2022

(65) Prior Publication Data

US 2022/0223174 A1 Jul. 14, 2022

(30) Foreign Application Priority Data

Jan. 11, 2021 (TW) ................................. 110100918

(51) Int. Cl.
*G10L 25/93* (2013.01)
*G10L 25/78* (2013.01)
*H04N 7/15* (2006.01)
*H04N 23/695* (2023.01)

(52) U.S. Cl.
CPC .............. *G10L 25/93* (2013.01); *G10L 25/78* (2013.01); *H04N 7/15* (2013.01); *H04N 23/695* (2023.01); *G10L 2025/783* (2013.01)

(58) Field of Classification Search
None
See application file for complete search history.

(56) References Cited

U.S. PATENT DOCUMENTS

| 11,404,073 | B1* | 8/2022 | Zhang | G10L 21/0216 |
| 2007/0263848 | A1* | 11/2007 | Sukkar | H04B 3/234 |
| | | | | 379/406.01 |
| 2009/0150149 | A1* | 6/2009 | Culter | G06F 18/256 |
| | | | | 704/201 |
| 2015/0110282 | A1* | 4/2015 | Sun | H04M 9/082 |
| | | | | 381/66 |
| 2019/0007623 | A1* | 1/2019 | Wang | H04N 7/147 |
| 2019/0096398 | A1* | 3/2019 | Sereshki | H04M 9/082 |
| 2021/0034892 | A1* | 2/2021 | Song | G06V 40/165 |

* cited by examiner

*Primary Examiner* — Stella L. Woo
(74) *Attorney, Agent, or Firm* — Maschoff Brennan

(57) ABSTRACT

A sound source tracking method adapted to an ongoing video conference comprising: obtaining a streaming signal of the video conference from an internet; performing a video conference procedure to obtain an audio signal from the streaming signal and send the audio signal to a speaker; performing an audio tracking procedure to obtain the audio signal outputted from the video conference procedure to the communication device and send the audio signal to a sound source tracking camera; playing the audio signal to generate a far-end sound; recording a field sound comprising at least one of the far-end sound and a local-end sound; and performing a comparing procedure to determine a shooting direction of the sound source tracking camera, wherein the shooting direction is adjusted so as not to shoot the speaker when a similarity of the far-end sound and the audio signal is greater than a threshold.

12 Claims, 2 Drawing Sheets

SOUND SOURCE TRACKING SYSTEM AND METHOD THEREOF

CROSS-REFERENCE TO RELATED APPLICATIONS

This non-provisional application claims priority under 35 U.S.C. § 119(a) on Patent Application No(s). 110100918 filed in Taiwan, ROC on Jan. 11, 2021, the entire contents of which are hereby incorporated by reference.

BACKGROUND

1. Technical Field

The present disclosure relates to a sound source tracking in a video conference, and more particularly to a sound source tracking system and method thereof which avoid to track a speaker.

2. Related Art

A common sound source tracking photography technology uses a microphone array to detect the position of the sound source, and calculates the displacement including pan, tilt, zoom (PTZ) between the original shooting direction and the direction of the sound source. The PTZ camera can track the person generating the sound. However, when a local-end user holds a video conference, the speaker will be used to play the sound of the far-end speaker, and the sound source tracking camera at the local-end may mistakenly track the speaker that plays the far-end sound instead of the local-end speaker.

The existing all-in-one video conference device has modules such as a processor, a microphone array, a speaker, a camera, and a sound tracking module. These modules need to be connected to each other by physical circuits, so they are built in a single device. After receiving the far-end sound from the internet, the all-in-one video conference device can play the far-end sound through the speaker. After the microphone array records the sound of the local-end speaker and the far-end sound played by the speaker, these sounds are sent to the sound tracking module. The sound tracking module performs an acoustic comparison procedure to filter the sound played by the built-in speaker of the video conference device. The sound tracking module only tracks the sound of the local-end speaker, and adjusts the camera's shooting direction to face the speaker.

However, the aforementioned all-in-one video conference device generally cannot connect to an external speaker additionally. Even if an external speaker can be connected, it cannot prevent the camera from mistakenly tracking to the external speaker that plays the far-end sound. In other words, since the speaker is an independent device, there is no physical wire to transmit the far-end sound to the sound tracking module, and echo cancellation and sound source tracking cannot be achieved. Therefore, in the aforementioned all-in-one video conference device, if the built-in speaker is damaged, the entire device must be sent for repair, and it cannot be used by connecting to an external speaker, which will cause a lot of inconvenience in practical applications.

SUMMARY

Accordingly, this disclosure provides a sound source tracking system and method thereof so that the video conference may use simple devices to achieve the purpose of sound source tracking.

According to an embodiment of the present disclosure, a sound source tracking system adapted to an ongoing video conference comprising: a processor configured to perform a video conference procedure and an audio tracking procedure; wherein the video conference procedure obtains an audio signal from a streaming signal and controls a communication device to send the audio signal to a speaker; and the audio tracking procedure obtains the audio signal outputted by the video conference procedure and controls the communication device to send the audio signal to a sound source tracking camera; the communication device electrically connecting to the processor, the speaker and the sound source tracking camera, wherein the communication device is configured to obtain the streaming signal of the video conference from an internet and send the audio signal to the speaker and the sound source tracking camera; the speaker playing the audio signal to generate a far-end sound; the sound source tracking camera configured to record a field sound, wherein the field sound comprises at least one of the far-end sound played by the speaker and a local-end sound, and the sound source tracking camera performs a comparing procedure according to the field sound and the audio signal to determine a shooting direction of the sound source tracking camera.

According to an embodiment of the present disclosure, a sound source tracking method adapted to an ongoing video conference comprising: controlling a communication device to obtain a streaming signal of the video conference from an internet by a processor; performing a video conference procedure by the processor, wherein the video conference procedure obtains an audio signal from the streaming signal and controls the communication device to send the audio signal to a speaker; performing an audio tracking procedure by the processor, wherein the audio tracking procedure obtains the audio signal outputted from the video conference procedure to the communication device and controls the communication device to send the audio signal to a sound source tracking camera; playing the audio signal by the speaker to generate a far-end sound; recording a field sound by the sound source tracking camera, wherein the filed sound; wherein the field sound comprises at least one of the far-end sound played by the speaker and a local-end sound; and performing a comparing procedure according to the field sound and the audio signal to determine a shooting direction of the sound source tracking camera by the sound source tracking camera.

The present disclosure uses independent speakers and independent sound source trackers to achieve the sound source tracking function unique to all-in-one video conference devices. The all-in-one video conference device is more expensive due to the integration of multiple components. Using the sound source tracking system and method thereof proposed in the present disclosure may achieve the effect of sound source tracking at a lower hardware price, and is not limited to hardware equipment of a specific brand. Therefore, it is more flexible in purchasing hardware required for video conference.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
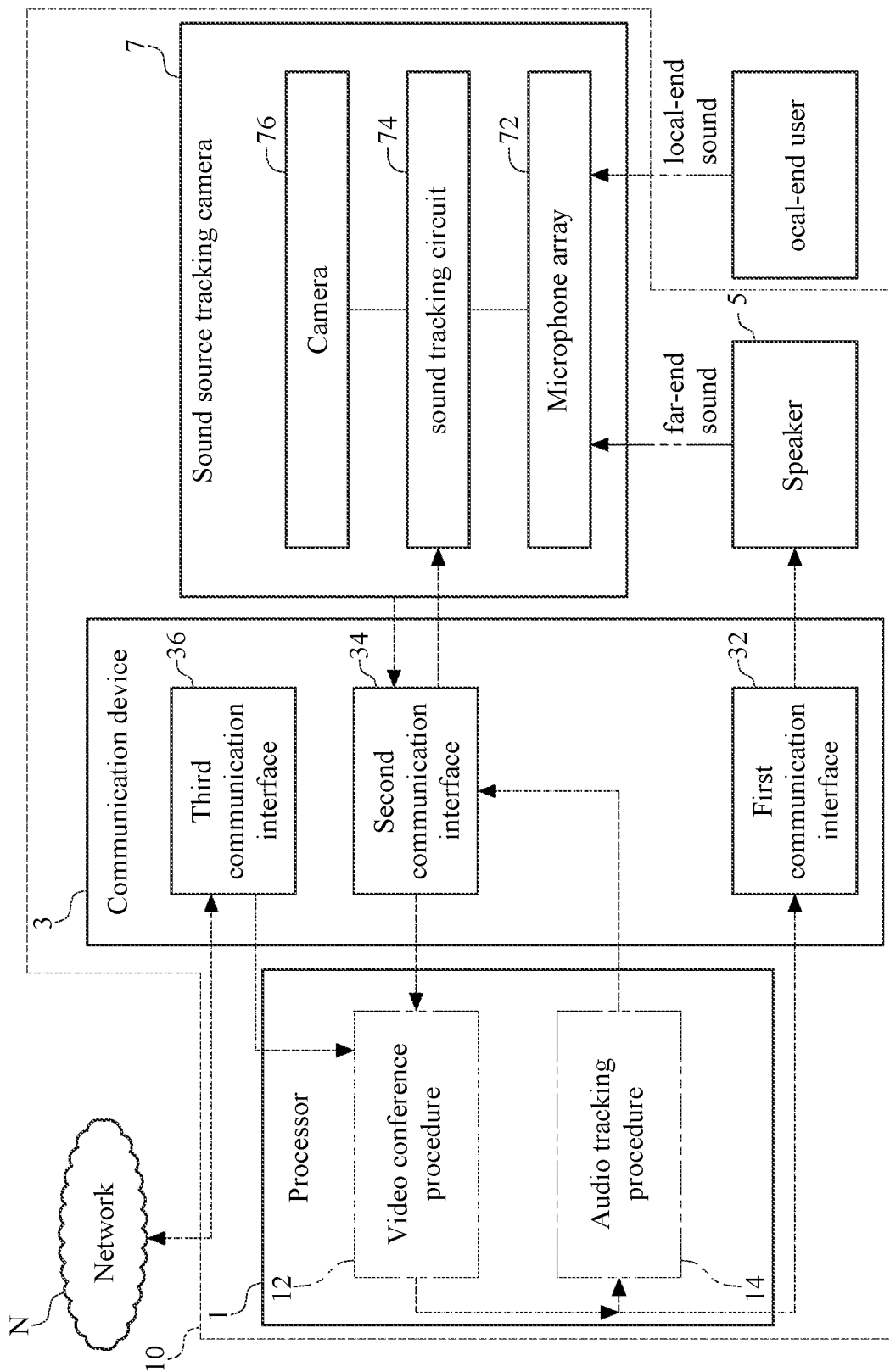
FIG. 1 shows a block diagram of a sound source tracking system according to an embodiment of the present disclosure.

The sound source tracking system and method thereof proposed by the present disclosure are adapted to perform a video conference. Please refer to FIG. 1. FIG. 1 shows a sound source tracking system 10 according to an embodiment of the present disclosure. The sound source tracking system 10 comprises a processor 1, a communication device 3, a speaker 5 and a sound source tracking camera 7. The following paragraphs describe the composition and characteristics of each component.

In an embodiment, the processor and the communication device 3 are hardware components disposed in the personal computer performing a conference application. The personal computer is, for example, a desktop computer, a laptop or a tablet computer.

The processor 1 is configured to perform a video conference procedure 12 and an audio tracking procedure 14. The video conference procedure 12 is, for example, the conference application mentioned before. The video conference procedure 12 extracts a video signal and obtains an audio signal from the streaming signal received from the internet N. The video signal is the image information captured by the local user who is conducting the remote conference, and the audio signal is the audio information captured by the remote user who is conducting the remote conference. The present disclosure does not limit the file format of the video signal and the file format of the audio signal. The video conference procedure 12 controls the communication device 3 to send the audio signal to a sound source tracking camera.

The audio tracking procedure 14 detects an activated state of the speaker 5 in advance. For example, when the communication device 3 electrically connects to a plurality of speakers 5, the audio tracking procedure 14 first determines which speaker 5 is used for playback. After the speaker 5 for playing sounds of the video conference is powered on, the audio tracking procedure 14 obtains the audio signal outputted from the video conference procedure 12 to the communication device 3, and controls the communication device 3 to send the audio signal to the sound source tracking camera 7. In an embodiment, the audio tracking procedure 14 is, for example, a self-written dispatch application. When the video conference procedure 12 running in the operating system sends the audio signal to the speaker 5 through the communication device 3, the audio tracking procedure 14 obtains the audio signal at the same time.

The communication device 3 electrically connects to the processor 1, the speaker 5, and the sound source tracking camera 7. In an embodiment, the communication device 3 comprises a first communication interface 32, a second communication interface 34 and a third communication interface 36. The first communication interface is, for example, a universal serial bus (USB) or an audio jack. The processor 1 electrically connects to the sound source tracking camera 7 through the second communication interface 34 of the communication device 3. The second communication interface 34 is, for example, a USB. The processor 1 communicably connects to the internet N through the third communication interface 36 of the communication device 3. The third communication interface 36 is, for example, the network card, the wireless network module, or a mobile network module. The present disclosure does not limit communication standards adopted by the first communication interface 32, the second communication interface 34, and the communication interface 36. According to the instruction of the processor 1 performing the video conference procedure 12, the communication device 3 obtains the streaming signal of the video conference from the internet N. The streaming signal is sent to the video conference procedure 12 of the processor 1 through the third communication interface 36. The video conference procedure 12 extracts the audio signal from the streaming signal and send this audio signal to the speaker 5 through the first communication interface 32. According to the instruction of the processor 1 performing the audio tracking procedure 14, the second communication interface 34 of the communication device 3 sends the audio signal to the sound source tracking camera 7.

The speaker 5 plays the audio signal to generate a far-end sound. The present disclosure does not limit the hardware type or the brand of the speaker 5.

The sound source tracking camera 7 comprises a microphone array 72, a sound tracking circuit 74 and a camera 76 with PTZ functions. The sound tracking circuit 74 electrically connects to the microphone array 72 and the camera 76. The present disclosure does not limit whether the sound source tracking camera 7 is an all-in-one device. In other embodiment, the microphone array 72, the sound tracking circuit 74 and the camera 76 may connect to each other through a physical wire or a wireless network, and adopt a separate arrangement.

The microphone array 72 is configured to record a field sound. The field sound comprises at least one of the far-end sound played by the speaker 5 and a local-end sound generated by the local-end user. In an embodiment, multiple users at the local-end may speak at the same time, so the local-end sound may comprise the voices of multiple users.

The sound tracking circuit 74 performs a comparing procedure according to the field sound and the audio signal to determine a shooting direction of the camera 76. The comparing procedure is associated with the acoustic echo suppression (AES) or the acoustic echo cancellation (AEC). When a similarity of the far-end sound and the audio signal is greater than a threshold, the sound tracking circuit 74 adjusts the shooting direction so as not to shoot the speaker 5. Specifically, the adjusted shooting direction is, for example, toward a default direction, or the original shooting direction is not changed, and the present disclosure does not limit thereto. In another embodiment, the sound tracking circuit 74 performs an acoustic comparison procedure to filter the far-end sound played by the speaker 5. The sound tracking circuit 74 only allows the camera 76 to track the voice of the speaker at the local-end (such as a conference room), and adjusts the shooting direction of the camera 76 to the speaker. Therefore, the function of sound source tracking of human voice may be implemented. If there are multiple local-end users speaks at the same time so that the local-end sound contains voices of multiple users, the sound tracking circuit 74 controls the camera 76 to face the voice of one of the local-end users. If the local-end sound and the far-end sound of the far-end user are generated at the same time, the sound tracking circuit 74 controls the camera to face the direction of the current local-end user instead of the direction of the speaker 5 playing the local-end sound.

Figure 2:
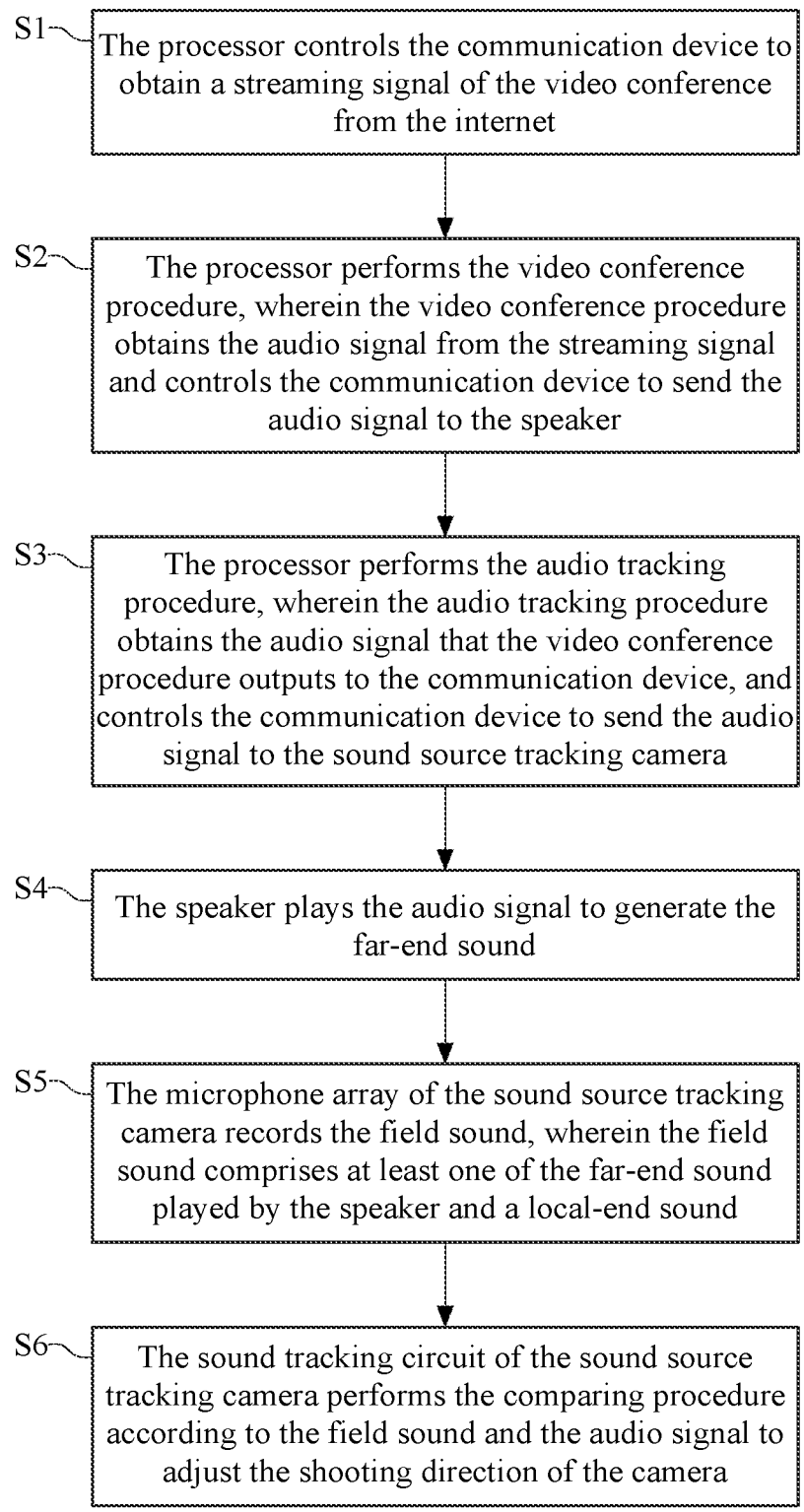
FIG. 2 shows a flowchart of the sound source tracking method according to an embodiment of the present disclosure.

Please refer to FIG. 2. FIG. 2 shows a flowchart of the sound source tracking method according to an embodiment of the present disclosure. The sound source tracking method is adapted to an ongoing video conference.

Please refer to step S1. The processor 1 controls the communication device 3 to obtain a streaming signal of the video conference from the internet N through the third communication interface 36.

Please refer to step S2. The processor 1 performs the video conference procedure 12. The video conference procedure 12 obtains the audio signal from the streaming signal and controls the communication device 3 to send the audio signal to the speaker 5 through the first communication interface 32.

Please refer to step S3. The processor 1 performs the audio tracking procedure 14. The audio tracking procedure 14 obtains the audio signal that the video conference procedure 12 outputs to the communication device 3 through the first communication interface 32, and controls the communication device 3 to send the audio signal to the sound source tracking camera 7 through the second communication interface 34. In another embodiment, before step S2, that is, before the processor 1 starts to perform the video conference procedure 12, the audio tracking procedure 14 detects the speaker 5 electrically connecting to the communication device 3 in advance, and determines the speaker 5 that will be used to play the far-end sound in current video conference procedure 12.

Please refer to step S4. The speaker 5 plays the audio signal to generate the far-end sound.

Please refer to step S5. The microphone array 72 of the sound source tracking camera 7 records the field sound. The field sound comprises at least one of the far-end sound played by the speaker 5 and a local-end sound generated by the local-end user. Please refer to FIG. 1. The local-end sound is generated by the local-end user. In the progress of real video conference, when the local-end user speaks, the microphone array 72 may record the local-end sound generated thereof.

Please refer to step S6. The sound tracking circuit 74 of the sound source tracking camera 7 performs a comparing procedure according to the field sound and the audio signal to adjust the shooting direction of the camera 76, wherein when the similarity of the far-end sound and the audio signal is greater than the threshold, the sound tracking circuit 74 adjusts the shooting direction so as not to shoot the speaker 5. Specifically, the adjusted shooting direction is, for example, toward the default direction when the sound source tracking camera 7 is activated or toward the original shooting direction.

In view of the above, the sound source tracking system and method thereof proposed in the present disclosure use independent speakers and independent sound source trackers to achieve the sound source tracking function unique to all-in-one video conference devices. The all-in-one video conferencing device is more expensive due to the integration of multiple components. Using the sound source tracking system and method thereof proposed in the present disclosure may achieve the effect of sound source tracking at a lower hardware price, and is not limited to hardware equipment of a specific brand. Therefore, it is more flexible in purchasing hardware required for video conference.

What is claimed is:

1. A sound source tracking system adapted to an ongoing video conference comprising:
   a processor configured to perform a video conference procedure and an audio tracking procedure; wherein the video conference procedure obtains an audio signal from a streaming signal and controls a communication device to send the audio signal to a speaker; and the audio tracking procedure includes a dispatch application obtaining the audio signal outputted by the video conference procedure and the audio tracking procedure controls the communication device to send the audio signal to a sound source tracking camera;
   the communication device electrically connecting to the processor, the speaker and the sound source tracking camera, wherein the communication device is configured to obtain the streaming signal of the video conference from an internet and send the audio signal to the speaker and the sound source tracking camera;
   the speaker playing the audio signal to generate a far-end sound;
   the sound source tracking camera configured to record a field sound, wherein the field sound comprises at least one of the far-end sound played by the speaker and a local-end sound, and the sound source tracking camera performs a comparing procedure according to the field sound and the audio signal to determine a shooting direction of the sound source tracking camera,
   wherein when the video conference procedure controls the communication device to send the audio signal to the speaker, the audio tracking procedure obtains the audio signal.

2. The sound source tracking system of claim 1, wherein the comparing procedure comprises: adjusting the shooting direction of the sound source tracking camera so as not to shoot the speaker when a similarity of the far-end sound and the audio signal is greater than a threshold.

3. The sound source tracking system of claim 2, wherein the sound tracking camera comprises a sound tracking circuit configured to perform an acoustic comparison procedure to filter the far-end sound played by the speaker.

4. The sound source tracking system of claim 1, wherein the audio tracking procedure is further configured to detect an activated state of the speaker before the audio tracking procedure obtains the audio signal.

5. The sound source tracking system of claim 1, wherein the communication device electrically connects to the sound source tracking camera through a universal serial bus.

6. The sound source tracking system of claim 1, wherein the communication device electrically connects to the speaker through a universal serial bus.

7. A sound source tracking method adapted to an ongoing video conference comprising:
   controlling a communication device to obtain a streaming signal of the video conference from an internet by a processor;
   performing a video conference procedure by the processor, wherein the video conference procedure obtains an audio signal from the streaming signal and controls the communication device to send the audio signal to a speaker;
   performing an audio tracking procedure by the processor, wherein the audio tracking procedure includes a dispatch application obtaining the audio signal outputted from the video conference procedure to the communication device and the audio tracking procedure controls the communication device to send the audio signal to a sound source tracking camera;

playing the audio signal by the speaker to generate a far-end sound;

recording a field sound by the sound source tracking camera, wherein the field sound comprises at least one of the far-end sound played by the speaker and a local-end sound; and performing a comparing procedure according to the field sound and the audio signal to determine a shooting direction of the sound source tracking camera by the sound source tracking camera, wherein when the video conference procedure controls the communication device to send the audio signal to the speaker, the audio tracking procedure obtains the audio signal.

8. The sound source tracking method of claim 7, wherein the comparing procedure comprises: adjusting the shooting direction of the sound source tracking camera so as not to shoot the speaker when a similarity of the far-end sound and the audio signal is greater than a threshold.

9. The sound source tracking method of claim 8, further comprising: performing, by a sound tracking circuit of the sound tracking camera, an acoustic comparison procedure to filter the far-end sound played by the speaker.

10. The sound source tracking method of claim 7, wherein the audio tracking procedure is further configured to detect an activated state of the speaker before the audio tracking procedure obtains the audio signal.

11. The sound source tracking method of claim 7, wherein the communication device electrically connects to the sound source tracking camera through a universal serial bus.

12. The sound source tracking method of claim 7, wherein the communication device electrically connects to the speaker through a universal serial bus.

* * * * *